Nov. 9, 1943.  H. A. WEDIN  2,334,052
DEVICE FOR AND METHOD OF MAKING FILLED FROZEN CONFECTIONS
Filed Jan. 27, 1940
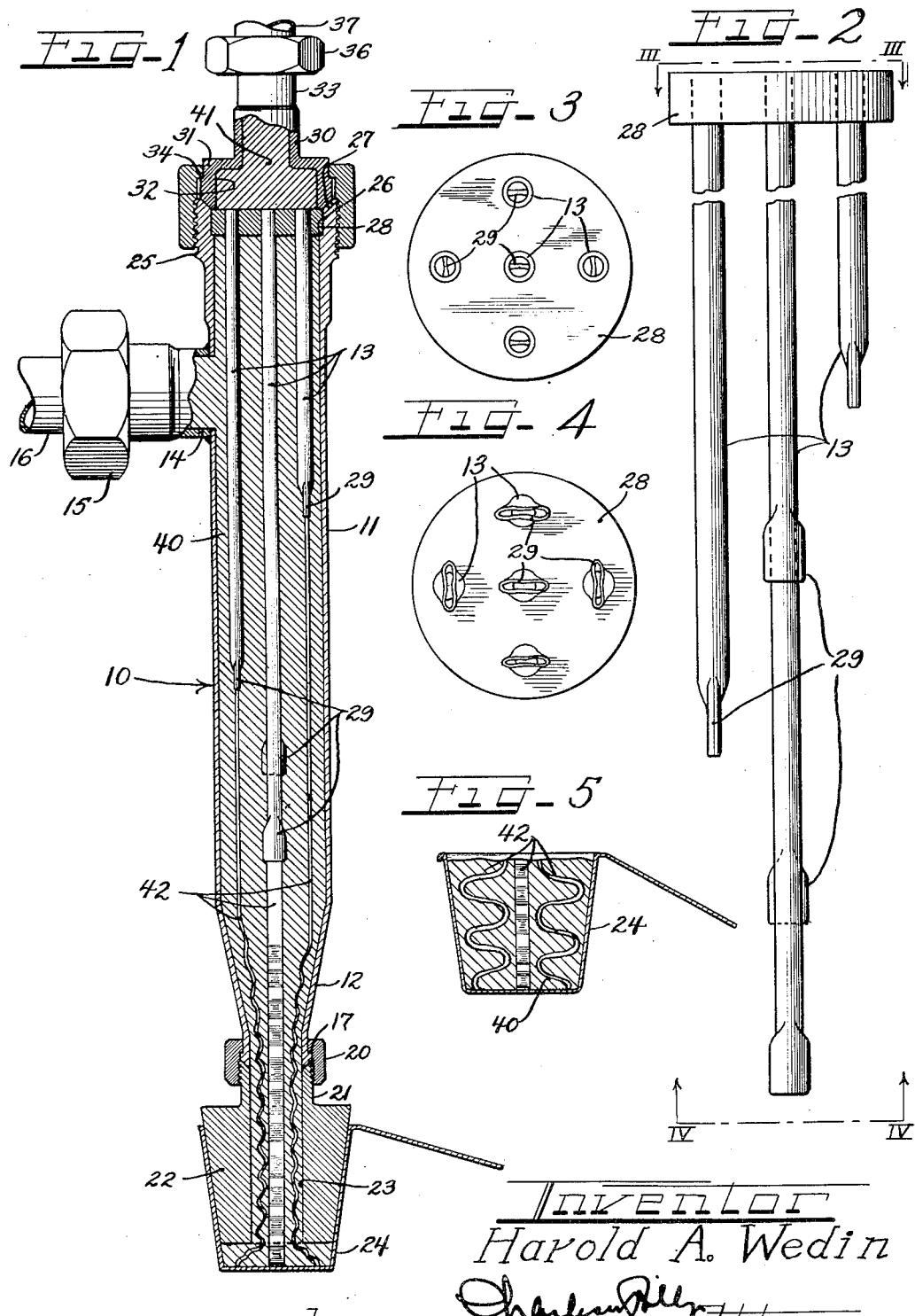
Inventor
Harold A. Wedin Patented Nov. 9, 1943

2,334,052

UNITED STATES PATENT OFFICE 2,334,052

DEVICE FOR AND METHOD OF MAKING FILLED FROZEN CONFECTIONS

Harold A. Wedin, Los Angeles, Calif., assignor to National Pectin Products Company, Chicago, Ill., a corporation of Illinois Application January 27, 1940, Serial No. 315,888

11 Claims. (Cl. 107—54)

This invention relates to a device for and method of making a filled frozen confection by extrusion. More particularly the invention pertains to double extrusion means and methods of making variegated ice cream composed of a continuous phase of one type of ice cream and undulating streaks or veins of some other type of ice cream, fruit jelly, sherbet, flavoring or coloring materials or the like.

Devices for simultaneous extrusion of ice cream and flavoring or coloring materials are known in the art. These devices include a conduit through which ice cream is extruded in a continuous phase. A straight vein of flavoring or coloring material is extruded into the ice cream moving through the conduit from a shorter round tube inserted into the conduit. The straight vein thus produced does not effect appreciable distribution of flavoring or coloring material throughout the continuous ice cream phase. As a result, the removal of spoonfuls of ice cream from various parts of a brick of ice cream will expose only relatively small areas of flavoring or coloring material.

The present invention provides means and methods for simultaneous double extrusion of ice cream and coloring or flavoring material to produce a variegated product having undulated veins of the material distributed throughout the ice cream.

According to the invention, a tube with a constricted discharge end is equipped with smaller and shorter tubes having flattened nozzles. These smaller tubes are disposed axially in the large tube and receive the coloring or flavoring material for discharging the same through the flattened nozzles in ribbon form into the large tube. The ice cream is moved through the large tube around the small tubes and the flavoring or coloring material is injected into the continuous ice cream phase from the smaller short tubes. The ribbons of flavoring or coloring material thus extruded into the ice cream undulate, distributing the flavoring or coloring material widely throughout the continuous ice cream phase, so that the removal of a spoonful of ice cream from any part of the ice cream will expose a considerable area of the flavoring or coloring material.

It is therefore an important object of the present invention to provide means and methods of making variegated ice cream composed of a continuous phase of one type of ice cream and undulating streaks or veins of another type of ice cream, sherbet, flavoring or coloring materials, or the like.

Another important object of this invention is to provide multi-extrusion means for making variegated ice cream including a large tube having a constricted portion for extruding ice cream to form a continuous phase, and an assemblage of smaller and shorter tubes with flattened nozzles in the large tube for extruding ribbons of flavoring or coloring materials or the like into the ice cream as it moves through the large tube.

Other and further important objects of the invention will become apparent to those skilled in the art from the disclosures in the specification and the accompanying drawing and claims.

This invention (in a preferred form) is illustrated in the drawing and hereinafter more fully described.

On the drawing:

Figure 1 is a vertical cross-sectional view, with parts in elevation, of a multi-extrusion device according to this invention.

Figure 2 is an enlarged broken side elevational view of the assemblage of smaller tubes in the device of Figure 1.

Figure 3 is a top plan view taken along the line III—III of Figure 2.

Figure 4 is a bottom plan view taken along the line IV—IV of Figure 2.

Figure 5 is a cross-sectional view through a package of ice cream made by the device of this invention.

As shown on the drawing:

The reference numeral 10 indicates generally a multi-extrusion device according to this invention. As best shown in Figure 1, the device 10 includes a cylindrical extrusion tube 11 having a tapering lower portion 12 defining a constricted discharge mouth. A plurality of relatively shorter and smaller extrusion tubes 13 are suspended longitudinally and in spaced relation in the tube 11 and terminate above the tapered portion 12.

An ice cream inlet pipe 14 discharges into the extrusion tube 11 intermediate the top of the latter and the ends of the smaller extrusion tubes 13. A union 15 connects the ice cream inlet pipe 14 to a supply pipe 16.

The constricted mouth of the tapered portion 12 is provided with an external shoulder 17 receiving an inturned flange of a nut 20 in rotatable relation thereon.

The nut 20 seated on the shoulder 17 receives a threaded nipple 21 of a replaceable block 22. The block 22 and nipple 21 have a cylindrical passageway therethrough registering with the constricted mouth of the tapered tube portion 12. The exterior of the block 22 is shaped to conform with the interior of an ice cream carton 24.

The upper end portion of the tube 11 is threaded externally as indicated by the reference numeral 25 and has a countersunk internal portion defining an internal shoulder 26. The mouth of the countersunk portion is reamed out to form a beveled seat 27.

As shown in Figures 2, 3 and 4, the smaller extrusion tubes 13 are held in assembled relationship by a head disc 28. The inlet ends of the tubes 13 may be force fitted into spaced apertures formed through the head disc 28 to have their top edges flush with the upper surface of the disc 28.

The lower ends of the smaller extrusion tubes 13 are flattened to provide ribbon forming nozzles 29. The tubes 13 are of unequal lengths and the nozzles 29 are thus disposed at various distances from the head disc 28.

As shown in Figure 1, the assemblage of smaller extrusion tubes 13 and head 28 is inserted into the threaded end portion of the large extrusion tube 11 with the lower edge of the head 28 engaging the shoulder 26. The extrusion tubes 13 are thus suspended into the large extrusion tube 11 with their nozzle ends 29 spaced at various levels below the ice cream inlet 14. This multi-level arrangement of the nozzles has proved to produce a better ripple or wave effect in the extruded ribbons.

A coupling member 30 having an enlarged head 31 defining a deep well 32 is seated on top of the head 28 and has a beveled edge engaging the beveled seat 27 of the countersunk tube portion. The well 32 joins the inlet orifices of the smaller extrusion tubes 13 with an inlet pipe 33 for flavoring material or the like. The head 31 is formed with an external shoulder 34 receiving the internal flange of a nut 35 threaded onto the threads 25 to hold the tube 11, the head 28 and the coupling member 30 in assembled relation.

A union 36 connects the pipe 33 to a conduit 37 for flavoring material or the like.

Ice cream fed through the pipe 14 into the large extrusion tube 11 is designated by the reference numeral 40. Flavoring material or the like fed through the inlet member 30 into the smaller extrusion tubes 13 is designated by the reference numeral 41 while the ribbons of flavoring material extruded through the flattened ends 29 of the smaller extrusion tubes 13 are designated by the reference numeral 42.

In operation, pasty semi-frozen ice cream 40 is force fed through the pipes 16 and 14 into the large extrusion tube 11 passing therefrom into block 22 and carton 24. Another type 41 of ice cream, sherbet, coloring or flavoring materials such as fruit jellies, jams or syrups, other fruit and/or nut compositions, chocolate syrups, or the like, is force fed through the tube 37 and the inlet member 30 into the smaller extrusion tubes 13, at any desired rate, such as, for example, the same rate as the ice cream, whence the material is injected into the ice cream moving through the large extrusion tube 11 as a plurality of ribbons 42. The thus produced variegated ice cream, composed of one continuous phase 40 of one type of ice cream together with flat veins 42 of another type 41 of ice cream, sherbet, coloring or flavoring material, moves through the tapering end portion 12 of the large extrusion tube 11, wherein the ribbons 42 assume an undulating configuration. A column of the variegated ice cream then passes through the block 22 into the carton or package 24.

The well 32 is made deep enough to supply the tubes 13 with equal amounts of flavoring or coloring material.

It is believed that the undulations of the veins are due to the tendency of the ribbons 42 to yield in the direction of their shortest dimensions when the injected ice cream is compressed as it passes through the constricted portion 12 of the tube 11.

As shown in Figures 1 and 5, the column of ice cream from the block is piled up under the block and spread out under pressure to fill the carton 24. This spreading out in the carton under back pressure further undulates or ripples the veins as shown in Figures 1 and 5 so that they traverse a large area of the ice cream mass. This forms a mass in which undulating or rippled veins 42 of flavoring or coloring material are widely distributed in a continuous ice cream phase 40.

The filled carton 24 is placed in a "hardening" room where the confection mass therein is frozen to a solid consistency.

Many other embodiments of the principles of the present invention besides the preferred example described hereinabove will suggest themselves to those skilled in the art. In general, the present invention includes the extrusion of veins or ribbons of one type of material into another type of material to produce a variegated product with undulated veins therein.

As indicated, various details of construction and operation may be varied through a wide range without departing from the principles of this invention and it is, therefore, not the purpose to limit the patent granted hereon otherwise than necessitated by the scope of the appended claims.

I claim as my invention:

1. A method of preparing a variegated frozen confection which comprises flowing a continuous column of plastic confection in one direction, injecting a plurality of transversely spaced ribbons of other confection material into said column in the same direction of flow and at different points along the length of the column, and constricting the injected column to cause the ribbons to undulate in the plastic confection for appreciably distributing the ribbons throughout the mass.

2. A device adapted for preparing a frozen confection composed of a continuous phase of ice cream and undulating veins of flavoring material, said device comprising an extrusion tube for said ice cream having a constricted portion, a plurality of terminally flattened relatively smaller extrusion tubes for said flavoring material suspended longitudinally in said first tube, means for supplying ice cream to said first tube, and means for supplying flavoring material to said smaller extension tubes.

3. A device adapted for preparing a variegated ice cream composed of a continuous ice cream phase and undulating veins of flavoring material, said device comprising an extrusion tube for said ice cream having a tapering discharging end portion, an ice cream feed pipe discharging into said extrusion tube at a point spaced from the ends thereof, a plurality of relatively shorter and smaller rounded extrusion tubes for said flavoring material having flattened nozzles and axially inserted, nozzles first, into the inlet end of said extrusion tube for said ice cream for a distance such that said nozzles project beyond the discharging point of said ice cream feed pipe, a feed pipe for said flavoring material, mechanical means connecting said smaller and shorter extrusion tubes with said feed pipe for flavoring material, and mechanical means for maintaining all said extrusion tubes and said connecting means in assembled relationship.

4. A device adapted for preparing a variegated ice cream composed of a continuous ice cream phase and undulating veins of flavoring material, said device comprising an extrusion tube for said ice cream having a tapering discharging end portion and another externally threaded and internally shouldered end portion, an ice cream feed line discharging into said extrusion tube at a point spaced from said two end portions, a plurality of relatively smaller and shorter rounded extrusion tubes for said flavoring material having flattened nozzles and inserted, nozzles first, into said extrusion tube for said ice cream for a distance such that said nozzles project beyond the point of discharge of said ice cream feed line but not to said tapering end portion, a head fitted over the unflattened inlet ends of said smaller and shorter extrusion tubes and seated against the internal shoulder of the externally threaded end portion of said extrusion tube for ice cream, a feed pipe for flavoring material, an inlet member connected to said feed pipe and having an externally shouldered enlarged head portion seated against the top surface of said head, and an internally flanged nut engaging both the threaded end portion of said extrusion tube for ice cream and the shoulder of the enlarged head portion of said inlet member, said nut holding said extrusion tube for ice cream, said head and said inlet member in assembled relationship.

5. A device adapted for preparing an ice cream composed of a continuous ice cream phase and undulating veins of flavoring material, said device comprising an extrusion tube for said ice cream and plurality of extrusion tubes for said flavoring material having flattened orifices discharging within said extrusion tube for ice cream, said first extrusion tube being shaped so as to impart an undulating configuration to the ribbons of flavoring material extruded through the smaller extrusion tubes.

6. A device adapted for preparing a variegated ice cream composed of a continuous ice cream phase and undulating veins of flavoring material, said device comprising an extrusion tube for said ice cream having a tapering discharging end portion and another externally threaded and internally shouldered end portion, an ice cream feed line discharging into said extrusion tube at a point spaced from said two end portions, a plurality of relatively smaller and shorter rounded extrusion tubes for said flavoring material having flattened nozzles and inserted, nozzles first, into said extrusion tube for said ice cream for a distance such that said nozzles project beyond the point of discharge of said ice cream feed line but not to said tapering end portion, a head fitted over the unflattened inlet ends of said smaller and shorter extrusion tubes and seated against the internal shoulder of the externally threaded end portion of said extrusion tube for ice cream, a feed pipe for flavoring material, an inlet member connected to said feed pipe and having an externally shouldered enlarged head portion seated against the top surface of said head, an internally flanged nut engaging both the threaded end portion of said extrusion tube for ice cream and the shoulder of the enlarged head portion of said connecting member, said nut holding said extrusion tube for ice cream, said head and said connecting member in assembled relationship, a centrally pierced block shaped in conformance with the interior of a receptacle for ice cream and means for maintaining said block in assembled registering relationship with the discharging end portion of said first extrusion tube.

7. A method of preparing a variegated frozen confection comprising flowing a continuous column of a plastic confection and constricting said column, flowing another continuous column of another plastic confection, subdividing said latter column to form a plurality of ribbon-shaped columns, and injecting said ribbon-shaped columns into said first column in the direction of flow of said first column before said first column is constricted, whereby said ribbons are caused to undulate in said first column.

8. A method of preparing a variegated frozen confection comprising forcibly flowing a continuous column of a plastic confection and constricting the same while independently forcibly flowing another continuous column of another plastic confection, subdividing said latter column to form a plurality of ribbon-shaped columns streaming through said first column before said first column is constricted, and injecting said ribbon-shaped columns at spaced points into said first column in the direction of flow thereof, to integrate said ribbon-shaped columns with said first column before said first column is constricted, whereby said ribbons are caused to undulate within said first column.

9. A method of preparing a variegated frozen confection comprising forcibly flowing a continuous column of a plastic confection and constricting the same while independently forcibly flowing another continuous column of another plastic confection, subdividing said latter column to form a plurality of spaced columns streaming through said first column, constricting said plurality of columns and injecting said plurality of columns into said first column in the direction of flow thereof, before said first column is constricted.

10. A method of preparing a variegated frozen confection comprising forcibly flowing a continuous column of a plastic confection, increasing and then reducing the cross sectional area of said column while forcibly flowing a plurality of columns of another plastic confection through said first column, constricting said plurality of columns as the cross sectional area of said first column is enlarged and thereafter injecting said plurality of constricted columns into said first column before the cross sectional area of said first column is reduced.

11. A method of preparing a frozen confection composed of a continuous phase of one type of confectionery material and a plurality of undulating veins of another type of confectionery material, said method comprising extruding a column of said first confectionery material, simultaneously injecting into said column a plurality of ribbons of said other type of confectionery material, reducing the cross sectional area of the resulting veined column, piling up the reduced veined column under pressure in an enlarged area to spread out the mass, and freezing the spread out mass.

HAROLD A. WEDIN.